United States Patent [19]
Jang

[11] Patent Number: 6,061,207
[45] Date of Patent: May 9, 2000

[54] MAGNETIC HEAD TRANSFERRING DEVICE OF HARD DISK DRIVE

[75] Inventor: Deok-hwan Jang, Suwon, Rep. of Korea

[73] Assignee: Samsung Electronics Co., Ltd., Kyungki-do, Rep. of Korea

[21] Appl. No.: 09/136,740

[22] Filed: Aug. 19, 1998

[30] Foreign Application Priority Data

Nov. 27, 1997 [KR] Rep. of Korea ........................ 97-63444
Dec. 30, 1997 [KR] Rep. of Korea ........................ 97-77801

[51] Int. Cl.⁷ ...................................................... G11B 5/54
[52] U.S. Cl. .............................................................. 360/105
[58] Field of Search ....................................... 360/105, 106

[56] References Cited

U.S. PATENT DOCUMENTS

| | | | |
|---|---|---|---|
| 4,691,258 | 9/1987 | Kobayashi et al. | 360/105 |
| 4,996,617 | 2/1991 | Yaeger et al. | 360/105 |
| 5,805,384 | 9/1998 | Bronshvatch et al. | 360/105 |
| 5,872,075 | 2/1999 | Hickox | 360/105 |

FOREIGN PATENT DOCUMENTS

| | | |
|---|---|---|
| 1-256075 | 10/1989 | Japan . |
| 2-172076 | 7/1990 | Japan . |
| 2-267786 | 11/1990 | Japan . |

*Primary Examiner*—Jefferson Evans
*Attorney, Agent, or Firm*—Sughrue, Mion, Zinn, Macpeak & Seas, PLLC

[57] ABSTRACT

In a magnetic head transferring device, of a hard disk drive, a locking member is provided to lock a rotor after the magnetic head is moved to a parking zone formed on a hard disk. The locking member includes a bimetal member which reversibly deforms when heated by an electric current supplied from a power supply source. The rotor has a coupling slot through which one side of the bimetal member selectively inserts into or separates from as the bimetal member deforms. Thus, since the rotation of the rotor is locked or unlocked using the bimetal member operating according to the turning on/off of power, an abnormal movement of the magnetic head is prevented regardless of the strength of external impacts.

9 Claims, 9 Drawing Sheets

MAGNETIC HEAD TRANSFERRING DEVICE OF HARD DISK DRIVE

BACKGROUND OF THE INVENTION

1. Field of the Invention

The present invention relates to a magnetic head transferring device of a hard disk drive, and more particularly, to a magnetic head transferring device of a hard disk drive having an improved structure for locking a magnetic head in a parking zone.

2. Description of the Related Art

As shown in FIG. 1, a general hard disk drive is comprised of a hard disk 20 rotatably installed on a base 10 for storing information, and a magnetic head transferring device for moving a magnetic head 50 to a desired track position on the hard disk 20 to read and write information. Here, the surface of the hard disk 20 is divided into two sections: a recording zone 22 in which information is recorded; and a parking zone 21 provided at the inner side of the hard disk 20 where the magnetic head 50 is placed when the rotation of the hard disk 20 stops.

The magnetic head transferring device has a rotor 30 installed for pivoting around a pivot shaft 34 provided on the base 10. The magnetic head 50 is mounted on the rotor 30. The magnetic head transferring device further includes a stator 40 for actuating the rotor 30 in a pivoting motion by an electromagnetic force, and a locking means for locking the rotor 30 after the magnetic head 50 is placed in the parking zone 21. The rotor 30 is comprised of a suspension portion 31 for supporting the magnetic head 50, a swing arm 32 installed for pivoting around the pivot shaft 34 via pivot bearings 34a, and a bobbin 33 around which a coil 35 is wound for generating an electromagnetic force. The stator 40 has a magnet 41 and a yoke 42 for forming a magnetic field. Thus, as an electromagnetic force is generated due to interaction between the magnetic field generated by the magnet 41 and the yoke 42, and the current flowing through the coil 35. The rotor 30 pivots in a direction according to Fleming's left-hand rule.

The locking means is comprised of a magnetic member 43 installed on the stator 40, a damper 60 coupled to a protrusion 36 provided at an end of the bobbin 33 of the rotor 30, and a magnetic plate 61 which is bonded at an end of the damper 60. When the magnetic head 50, installed on the suspension portion 31, enters the parking zone 21 of the hard disk 20 as the rotor 30 is pivoted, the magnetic plate 61 on the bobbin 33 is attracted and stuck to the magnetic member 43, as shown in the drawing. Thus, the rotor 30 remains in a locked state in which the magnetic plate 61 and the magnetic member 43 are stuck to each other. The rotor 30 remains locked until an electromagnetic force for pivoting the rotor operates again.

However, in the conventional locking means as described above, since the rotor 30 is locked by the magnetic force generated between the magnetic plate 61 and the magnetic member 43, when an impact stronger than the magnetic force is applied in the locked state, the locked state is released. Also, in order to pivot the locked rotor 30 again, the electromagnetic force generated by the coil 35 and the magnetic member 41 must be greater than the magnetic force by which the magnetic plate 61 and the magnetic member 43 are stuck together. That is, when the magnetic force between the magnetic plate 61 and the magnetic member 43 is smaller than that between the coil 35 and the magnet 41, the locking of the rotor 30 can be easily released by a small external impact, whereas, if it is made to be stronger, the rotor 30 does not unlock well by generating an electromagnetic force.

SUMMARY OF THE INVENTION

To solve the above problem, it is an objective of the present invention to provide a magnetic head transferring device, of a hard disk drive, in which a magnetic head is so firmly locked that it is not released by external impacts regardless of the strength of impact, but which can be easily unlocked if desired.

Accordingly, to achieve an above objective, there is provided a magnetic head transferring device, of a hard disk drive, comprising a rotor installed for rotating around a pivot shaft member provided on a base and having a coupling slot, a magnetic head, mounted on one side of the rotor for reading information from, and writing information on, the hard disk, a stator for rotating the rotor such that the magnetic head moves across a parking zone and a recording zone formed on the hard disk, and a bimetal member installed at one end portion of the pivot shaft member. The bimetal member reversibly deforms so as to be inserted into or separated from the coupling slot as it is heated by an electric current supplied from a predetermined power supply source. The rotor is locked as the bimetal member is coupled to the coupling slot.

According to another aspect of the present invention, there is provided a magnetic head transferring device, of a hard disk drive, comprising a rotor rotatably installed on a base, a magnetic head, mounted on one side of the rotor for reading information from, and writing information on, the hard disk. The magnetic head transferring device also includes a stator for rotating the rotor such that the magnetic head moves across a parking zone and a recording zone formed on the hard disk, a first hook portion provided at one side of the rotor, a link member having a second hook portion for preventing rotation of the rotor by being elastically and selectively coupled to the first hook portion provided at one side thereof, and a bimetal member installed adjacent to the other side of the link member. When the bimetal member is heated by a predetermined heating source, it deforms and pushes the other side of the link member so as to move the link member such that the second hook portion separates from the first hook portion. The magnetic head transferring device further includes an elastic member for applying an elastic biasing force to the link member so that the second hook portion moves toward the first hook portion for coupling thereto.

According to yet another aspect of the present invention, there is provided a magnetic head transferring device, of a hard disk drive, comprising a rotor rotatably installed on a base, a magnetic head mounted on one side of the rotor, for reading information from, and writing information on, the hard disk. The magnetic head transferring device also includes a stator for rotating the rotor such that the magnetic head moves across a parking zone and a recording zone formed on the hard disk, a protrusion provided at a second side of the rotor, a first lever member, rotatably installed on the base, for restricting rotation of the rotor by contacting one side surface of the protrusion when the magnetic head is located in the parking zone, and a bimetal member installed adjacent to the other side of the first lever member. When the bimetal member is heated by a predetermined heating source, it deforms and pushes one side of the first lever member so that the first lever member is detached from the one side surface of the protrusion. The magnetic head transferring device further includes a hook pin provided on the base, a second lever member coupled to the first lever member so as to be capable of contacting the other side surface of the protrusion. The second lever member includes a hook portion to be hooked by the hook pin. The second lever member locks the first lever member as the hook portion is hooked by the hook pin when the first lever member rotates in a direction so as to be detached from the protrusion. The first lever member is pushed by contact with the other side surface of the protrusion as the rotor rotates such that the magnetic head is located in the parking zone so that the hook portion is released from the hook pin. Still further, the magnetic head transferring device includes an elastic member for elastically biasing the first lever member in a direction to contact one side surface of the protrusion.

BRIEF DESCRIPTION OF THE DRAWINGS

The above and other objectives and advantages of the present invention will become more apparent by describing in detail a preferred embodiment thereof with reference to the attached drawings in which.

DETAILED DESCRIPTION OF THE INVENTION

Figure 1:
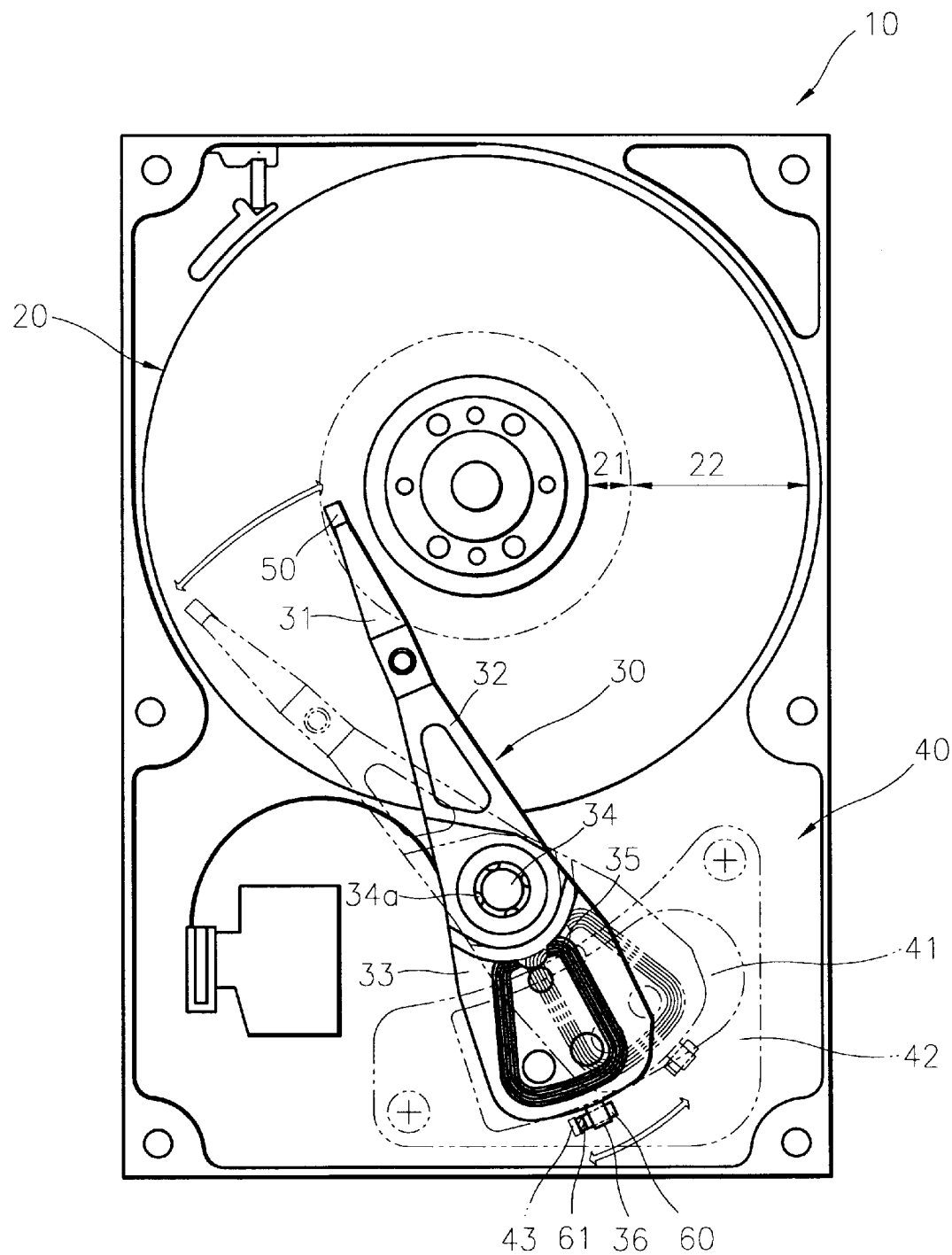
FIG. 1 is a plan view illustrating the magnetic head transferring device apparatus of a conventional hard disk drive.
Figure 2:
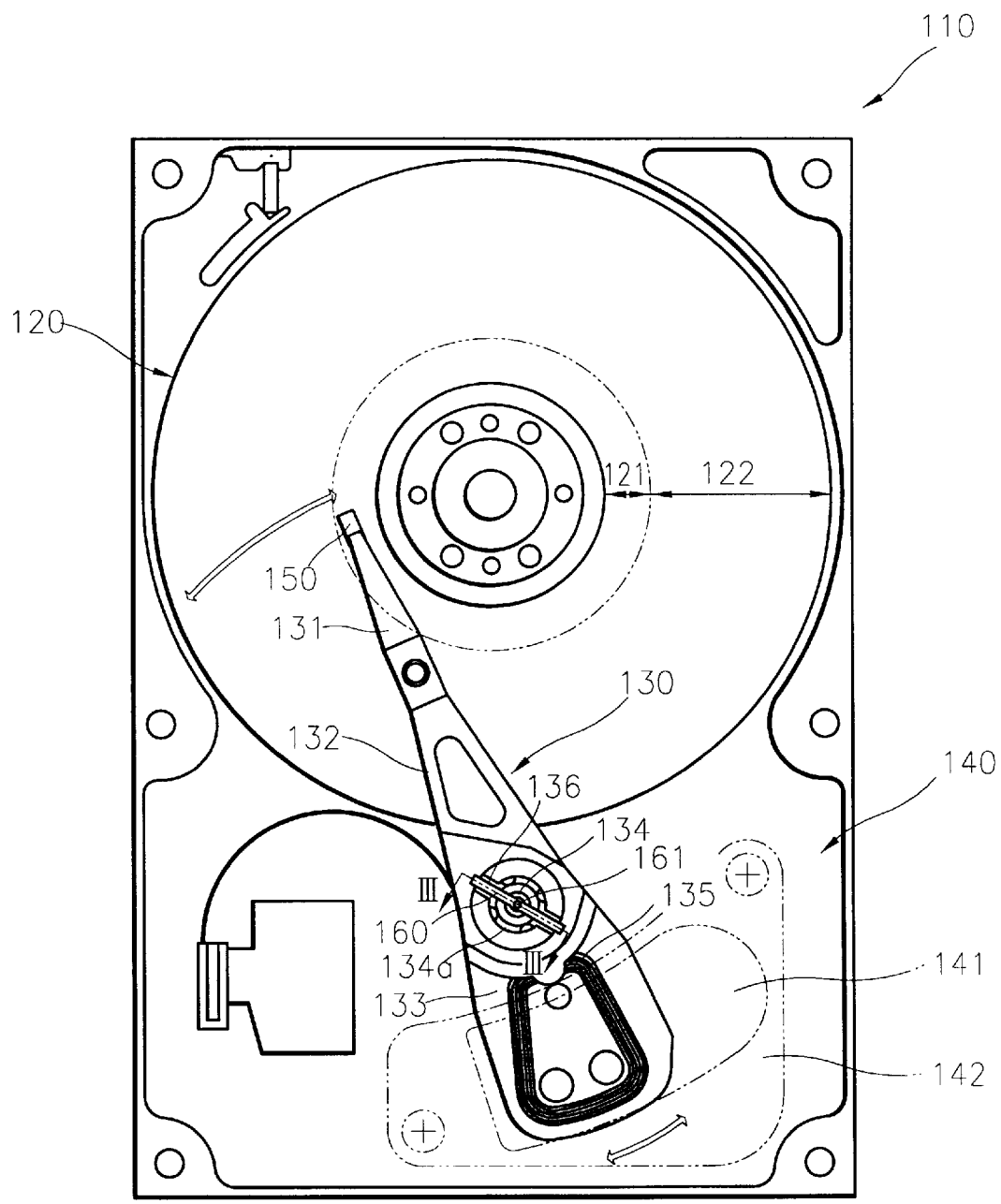
FIG. 2 is a plan view illustrating a magnetic head transferring device according to a first preferred embodiment of the present invention.

FIGS. 2 through 4B show a magnetic head transferring device, of a hard disk drive, according to a first preferred embodiment of the present invention. Referring to FIG. 2, the magnetic head transferring device according to the present invention is comprised of a pivot shaft member 134 fixed on a base 110 on which a hard disk drive 120 is installed. A rotor 130 has a magnetic head 150 mounted at one end thereof. Pivot bearings 134a support the rotor 130 for rotation about the pivot shaft member 134. The magnetic head transferring device further includes a stator 140 for actuating the rotor 130 to thereby move the magnetic head 150 across a parking zone 121 and a recording zone 122 formed on the surface of the hard disk 120. The rotor 130 consists of a suspension portion 131 for supporting the magnetic head 150, a swing arm 132 rotatably coupled to the pivot bearings 134a provided on the base 110, and a bobbin 133 around which is wound a coil 135 for generating an electromagnetic force. The stator 140 consists of a magnet 141 and a yoke 142 for generating a magnetic field.

Figure 3:
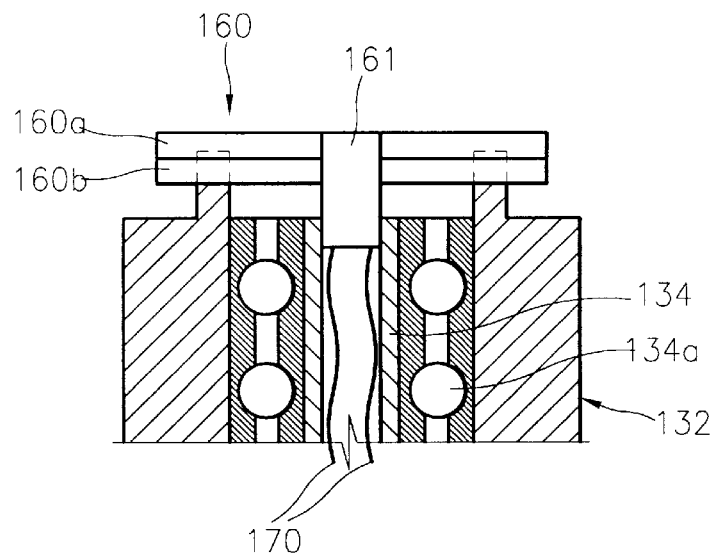
FIG. 3 is a sectional view taken along line III—III of FIG. 2, showing a locked state of the magnetic head transferring device.

As a locking means for locking the rotor 130, when the magnetic head 150 is positioned in the parking zone 121 of the hard disk 120, there is provided a bimetal member 160 installed at an end of the pivot shaft member 134. The bimetal member is reversibly deformed when heated by an electric current applied from a predetermined supply source. The locking means also includes a coupling slot 136 formed on the swing arm 132 of the rotor 130 such that one end portion of the bimetal member 160 can be selectively inserted therein or separated therefrom as the bimetal member 160 deforms. Referring to FIG. 3, the bimetal member 160 includes an upper metal portion 160a which has a thermal expansion coefficient that is lower than that of a lower metal portion 160b so that both ends of the bimetal member 160 bend upward as it is heated. Reference numerals 161 and 170 indicate a holder for supporting the bimetal member 160 and a lead wire for supplying an electric current to the bimetal member 160, respectively. Preferably, a power supply source for driving the hard disk 120 is also used for the bimetal member 160.

Figure 4A:
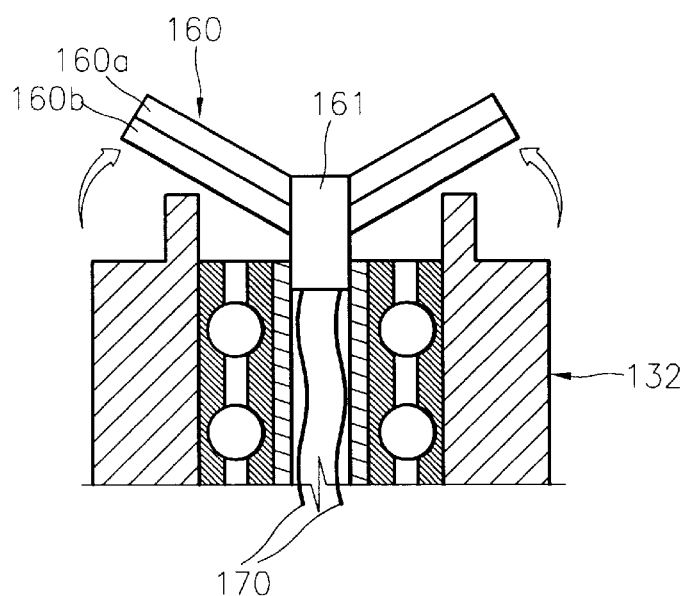
FIG. 4A is a sectional view taken along line III—III of FIG. 2, showing an unlocked state of the magnetic head transferring device.
Figure 4B:
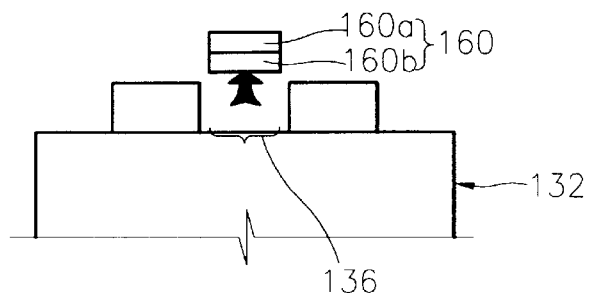
FIG. 4B is a side view schematically showing the unlocked state of the magnetic head transferring device shown in FIG. 4A.
Figure 5:
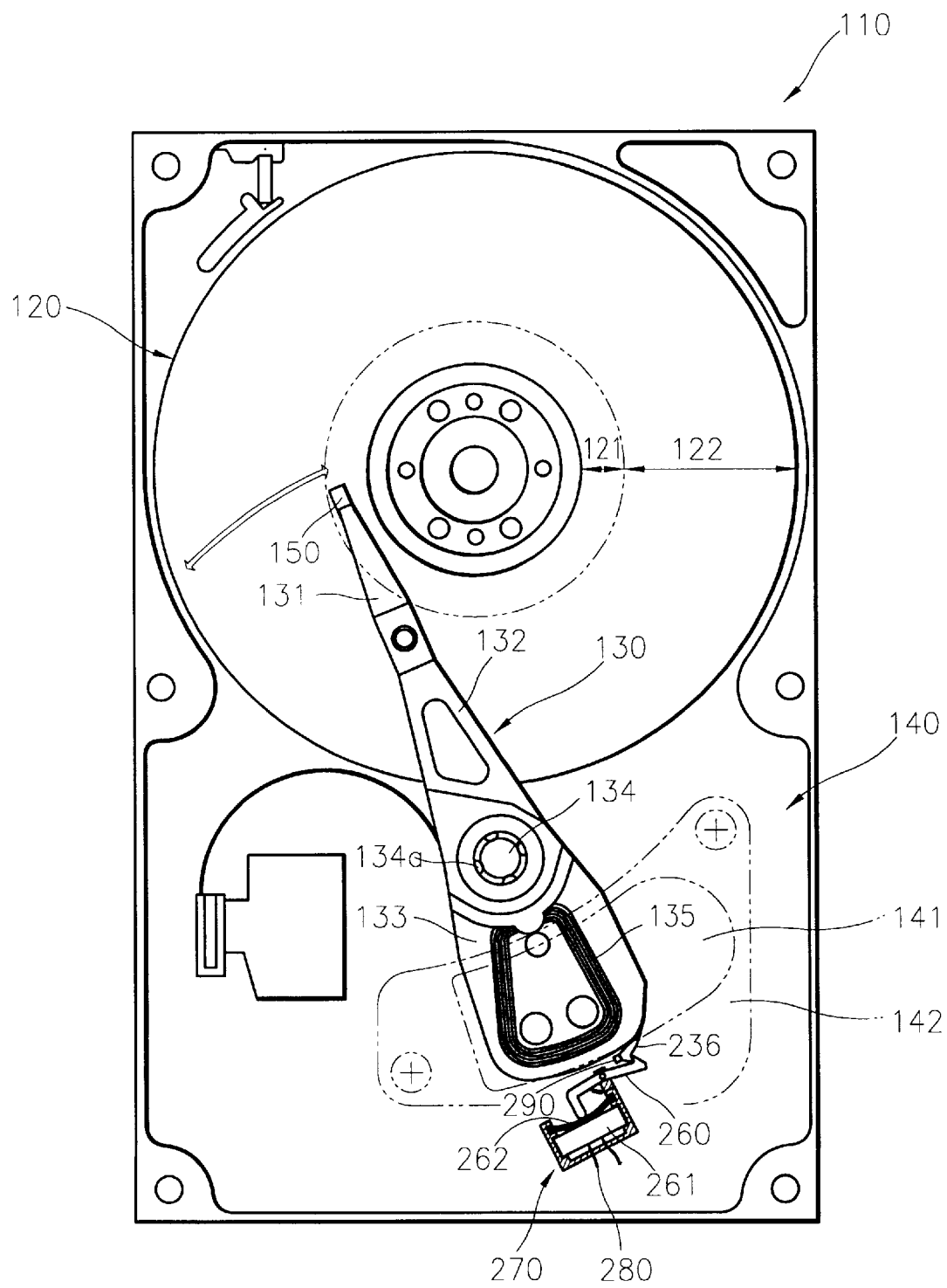
FIG. 5 is a plan view illustrating a magnetic head transferring device according to a second preferred embodiment of the present invention.

In the above-described structure, of the first embodiment, when power is turned on, an electric current is supplied to the bimetal member 160 through the lead wire 170. Due to resistance heat generated by the current, the bimetal member 160 thermally expands. Because a metal member exhibiting a lower thermal expansion coefficient is disposed in the upper portion of the bimetal member 160, as shown in FIGS. 4A and 4B, the bimetal member 160 bends upward. Accordingly, both end portions of the bimetal member 160 are separated from the coupling slot 136 so that the rotor 130, including the swing arm 132, can rotate. Thus, the magnetic head 150 mounted on the rotor 130 can be smoothly moved to a desired position on the hard disk 120.

When power is turned off and the rotation of the hard disk 120 stops, an electromagnetic force is generated by the coil 135 and the magnet 141. The rotor 130 pivots such that the magnetic head 150 enters the parking zone 121. Also, since the current supplied to the bimetal member 160 is no longer supplied, the thermal source which heats the bimetal member 160 disappears. Accordingly, the thermally expanded bimetal member 160 returns to its original flat shape, as shown in FIG. 3, wherein both end portions thereof are inserted into the coupling slot 136 (see FIG. 4B) provided in the swing arm 132 of the rotor 130. That is, the hard disk 120 rotates further due to the force of inertia and then is stopped as the bimetal member 160 is coupled to the coupling slot 136. Accordingly, since the bimetal member 160 serves as a latch so that the rotation of the swing arm 132 is completely prevented, even a strong impact can not push the magnetic head, positioned in the parking zone 121, to a position in the recording zone 122. As described above, since the rotor 130 is locked and unlocked by the bimetal member 160, the locking action is not released even by a strong impact. Also, the unlocking action is easily performed by turning on the power.

Next, FIGS. 5 through 8 show a magnetic head transferring device of a hard disk according to a second preferred embodiment of the present invention. In the drawings, similar reference numerals as in the description of the first preferred embodiment indicate similar elements. In the present embodiment, a locking means for locking the rotor 130 when the magnetic head 150 is located in the parking zone 121 of the hard disk 120 includes a first hook portion 236 provided at the end portion of the rotor 130, a link member 260 having a second hook portion 260a which is elastically coupled to the first hook portion 236, an elastic member such as a tension spring 263 for supplying an elastic biasing force to the link member such that the second hook portion 260a can be coupled to the first hook portion 236. The locking means further includes a bimetal member 262 for rotating the link member 260 in a direction such that the second hook portion 260a is separated from the first hook portion 236. In this embodiment, the bimetal member 262 is housed in a predetermined case 270 and the link member 260 is hinge-coupled at one side of the case 270.

Figure 6:
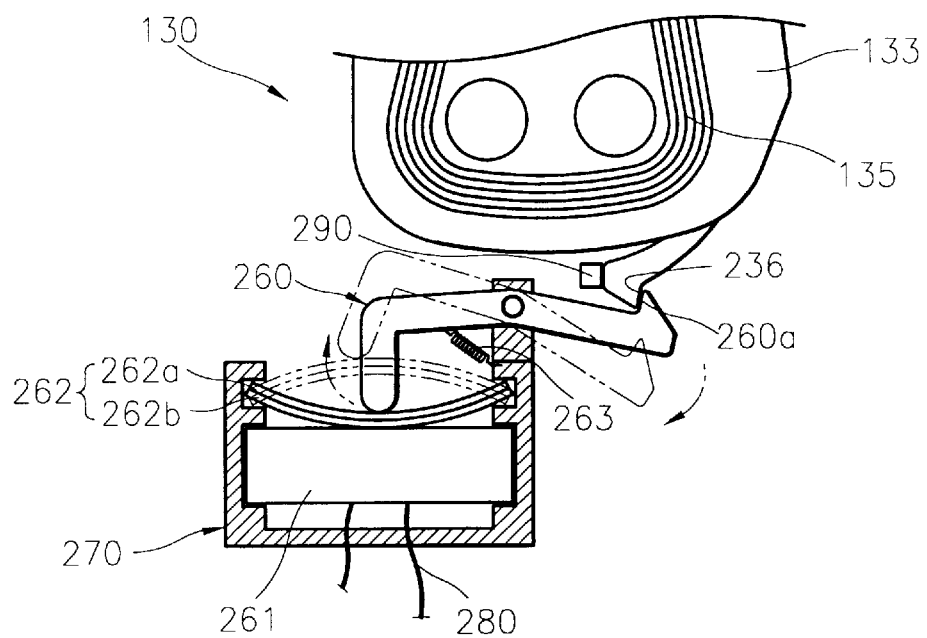
FIGS. 6 and 7 are plan views for showing the major actions of the magnetic head transferring device shown in FIG. 5.

The bimetal member 262 is heated by a heating plate 261 which is heated by the supply of current. When heated, the bimetal member 262 deforms as indicated by a double-dot-dashed line, as shown in FIG. 6, and pushes one end of the link member 260. In the bimetal member 262, the thermal expansion coefficient of an upper metal member 262a is higher than that of a lower metal member 262b so that the mid-portion of the bimetal member 262 deforms to be bent upward as the temperature of the bimetal member 262 increases. Reference numerals 280 and 290 indicate a lead wire for supplying an electric current to the heating plate 261 and a stopper for restricting the rotational range of the rotor 130, respectively.

Figure 7:
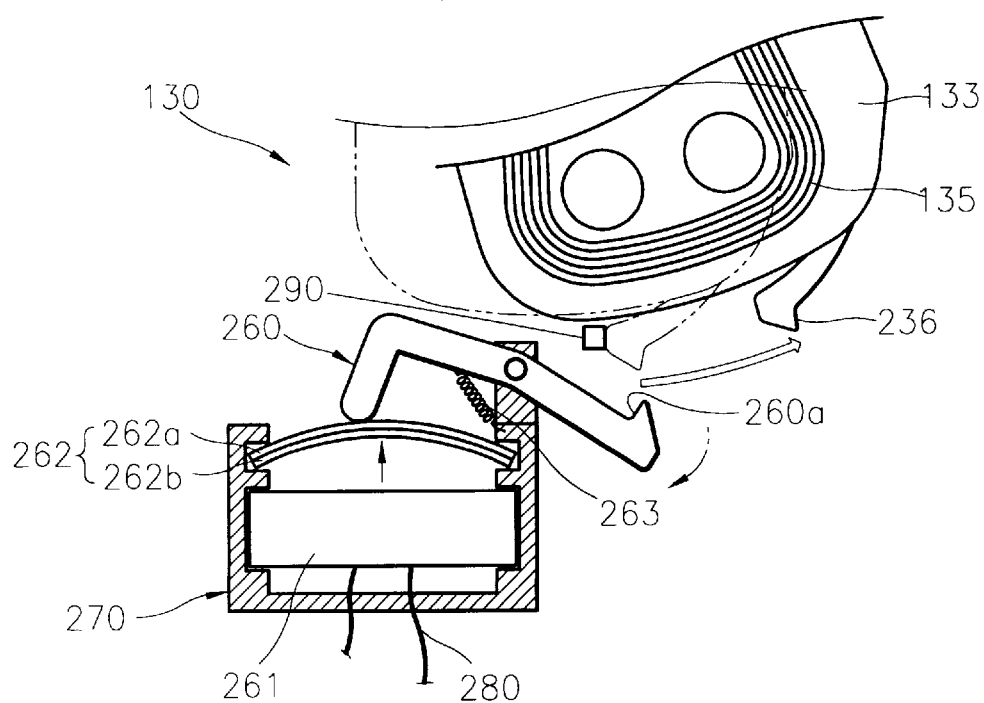

In the locking means of the second embodiment, when power is turned on, an electric current is supplied to the heating plate 261 through the lead wire 280. Accordingly, resistance heat is generated and transferred to the bimetal member 262 so that the bimetal member 262 begins to thermally expand. Since the upper metal member 262a of the bimetal member 262 has a higher thermal expansion coefficient than the lower metal member 262b, the mid-portion of the bimetal member 260 deforms to be bent upward. Accordingly, the mid-portion of the bimetal member 262 pushes up one end portion of the link member 260 which thus rotates clockwise on the drawing so that the second hook portion 260a is detached from the first hook portion 236. Then, the rotor 130 can rotate and the magnetic head 150 mounted on the rotor 130 can freely move to a desired position on the hard disk 120. After the rotor 130 rotates so that the magnetic head 150 is moved to the recording zone 122 of the hard disk 120, as shown in FIG. 7, the current supplied to the heating plate 261 is cut off. Then, the bimetal member 260 returns to its initial position and the link member 260 also returns to its initial position by action of the tension spring 263. That is, the link member 260 is returned to a position where the second hook portion 260a can latch the first hook portion 236 of the rotor 130.

When power of the disk drive is turned off and the rotation of the hard disk 120 stops, an electromagnetic force is generated in the magnetic field generated between the coil 135 and the magnet 141. The rotor 130 is thereby rotated such that the magnetic head 150 enters the parking zone 121. Accordingly, the first hook portion 236 is elastically coupled to the second hook portion 260a, which had previously returned to its initial position, so that the rotor 130 is locked as shown in the solid lines of FIG. 6. As power of the disk drive is turned off, the rotation of the hard disk 120 stops and the lifting of the magnetic head 150 disappears, so that the magnetic head 150 is placed on the parking zone 121.

As described above, in the magnetic head transferring device according to the second embodiment, since the rotor 130 is locked using the first and second hook portions 236 and 260a, the locking is not released by a strong impact. Also, unlocking of the rotor 130 can be easily performed by deforming the bimetal member 262 to separate the first and second hook portions 236 and 260a.

Figure 8:
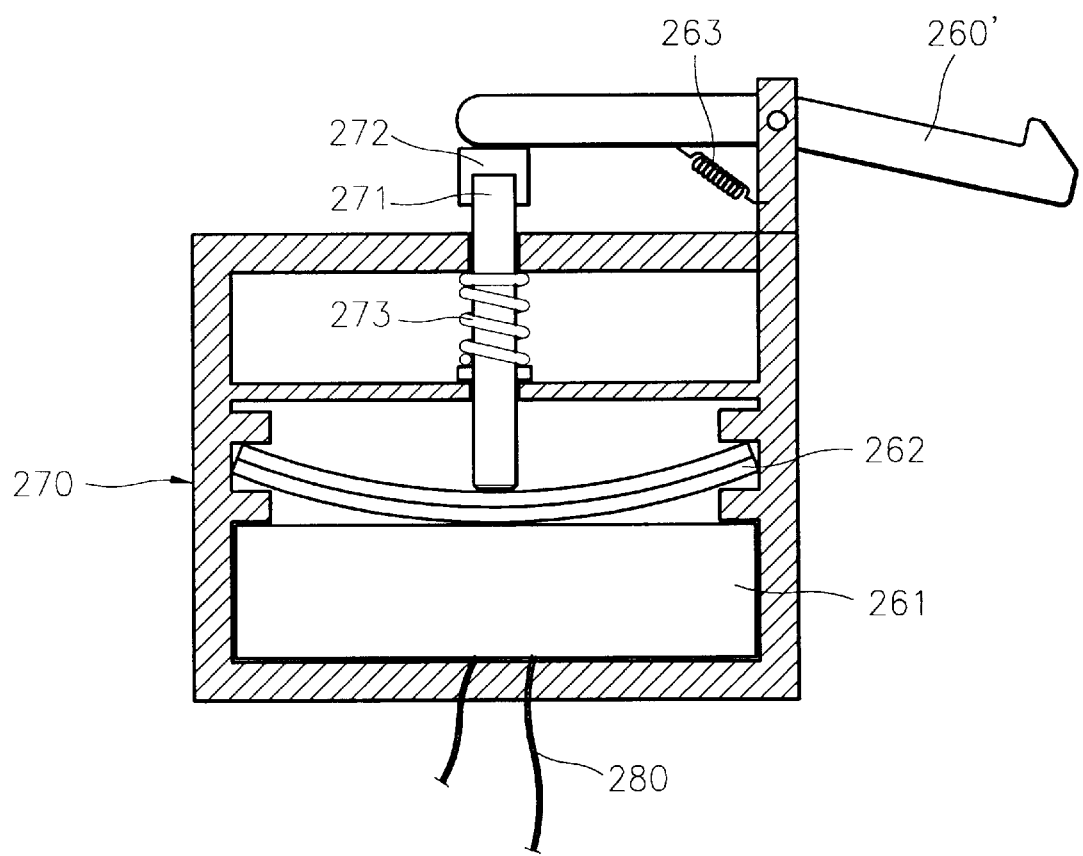
FIG. 8 is a plan view showing another example of the magnetic head transferring device according to the second preferred embodiment of the present invention shown in FIG. 5.
Figure 9:
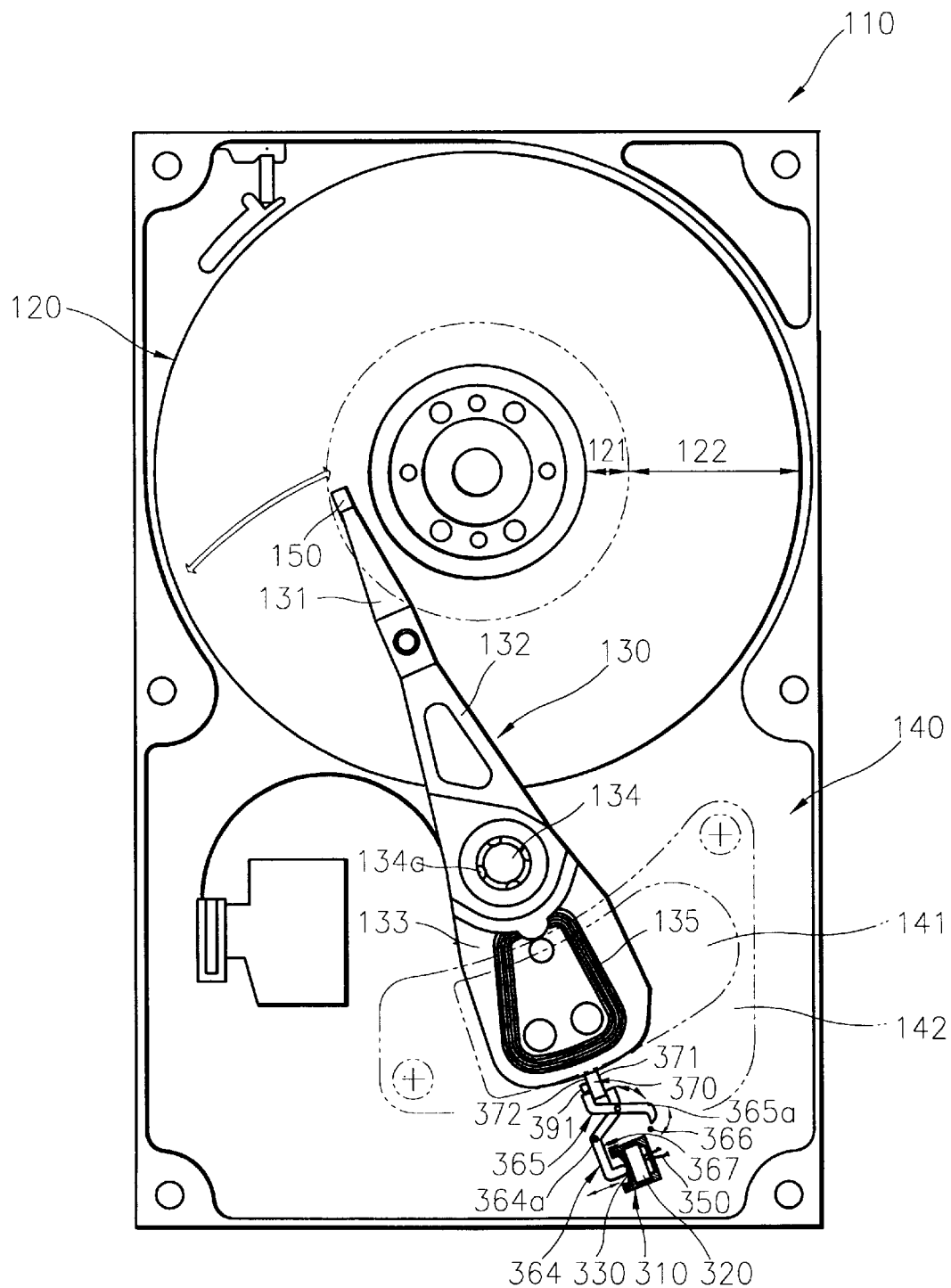
FIG. 9 is a plan view showing magnetic head transferring device according to a third preferred embodiment of the present invention.

Although, in the second preferred embodiment, one end portion of the link member 260 directly contacts the mid-portion of the bimetal member 262 to be pushed according to the deformation of the bimetal member 262, alternative arrangements are possible. For example, as shown in FIG. 8, a rod member 271 elastically supported by a compression spring 273 can be interposed between the bimetal member 262 and the link member 260', so that one end portion of the rod member 271 can push up the link member 260'. Here, a rubber member 272 can further be provided to prevent impact and abrasion between the rod member 271 and the link member 260'.

Next, FIGS. 9 through 12 show a magnetic head transferring device according to a third preferred embodiment of the present invention. In the drawings, similar reference numerals as in the description of the first and second preferred embodiments indicate similar elements.

Referring to the drawings, the locking means for locking the rotor 130 includes a protrusion 370 formed on one end portion of the rotor 130, and a first lever member 364 installed so as to rotate about a rotation shaft 364a provided on the base 110 for restricting rotation of the rotor 130 by being in contact with one side surface 371 of the protrusion 370 when the magnetic head 150 is placed in the parking zone 121. The locking means also includes a bimetal member 330 which deforms so as to press one end of the first lever member as a heating plate 320 is heated by the supply of current. Still further, the locking means includes a second lever member 365 which is coupled to the first lever member 364 for contacting the other side surface 372 of the protrusion 370. The second lever member 365 has a hook portion 365a formed at one end thereof to be coupled to a hook pin 366 provided on the base 110. The locking means also includes a compression spring 340 for elastically biasing the first lever member 364 to contact the one side surface 371 of the protrusion 370.

In this embodiment, the second lever member 365 is rotated together with the first lever member 364. When the first lever member 364 is rotated in a direction to separate from the protrusion 370, the hook portion 365a of the second lever member 365 is coupled to the hook pin 366 so that the rotation of the first lever member 364 is locked. When the rotor 130 rotates such that the magnetic head 150 is placed in the parking zone 121, the second lever member 365 is pressed by contact with the other side surface 372 of the protrusion 370 so that coupling between the hook portion 365a and the hook pin 366, by which the rotation of the first lever member 364 had been restricted, is released.

Reference numerals 391, 310, and 350 indicate a stopper for restricting the range of rotation of the rotor 130, a case in which the heating plate 320 and the bimetal member 330 are housed, and a lead wire through which an electric current is supplied to the heating plate, respectively.

Figure 10:
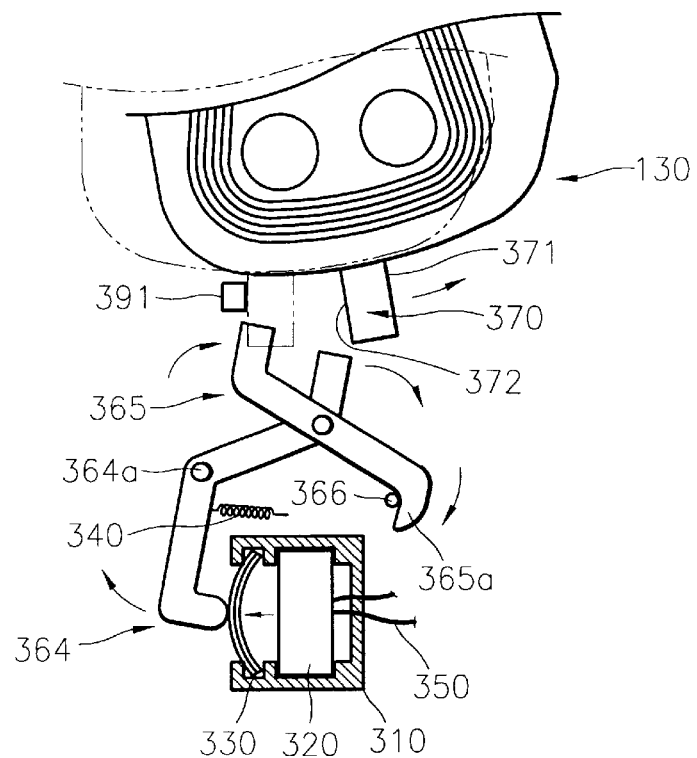
FIGS. 10 and 11 are plan views for showing the major actions of the magnetic head transferring device shown in FIG. 9.

In the locking means having the structure of the third embodiment, when power is turned on, an electric current is supplied to the heating plate 320 through the lead wire 350. Then, resistance heat is generated and transferred to the bimetal member 330 so that the bimetal member 330 thermally expands. As a result, as shown in FIG. 10, the mid-portion of the bimetal member 330 deforms so as to be bent to the left. Accordingly, the mid-portion of the bimetal member 330 pushes one end portion of the first lever member 364 to rotate it clockwise on the drawing so that the first lever member 364 is detached from the one side surface 371 of the protrusion 370. Then, the rotor 130 can rotate and the magnetic head 150 mounted on the rotor 130 can freely move to a desired position on the hard disk 120.

In this embodiment, the second lever member 365 rotates clockwise as the first lever member 364 rotates and the hook portion 365a is hooked by the hook pin 366. When the hook portion 365a is hooked by the hook pin 366 as above, the first and second lever members 364 and 365 stop rotating, until an additional external force is applied. Also, as the locking means is released, the rotor 130 rotates such that the magnetic head 150 can move to the recording zone 122 of the hard disk 120 and the supply of current to the heating plate 320 is cut off. Then, the bimetal member 330 returns to its original shape. However, the first and second lever members 364 and 365 remain in a state in which the hook portion 365a is hooked by the hook pin 366.

Figure 11:
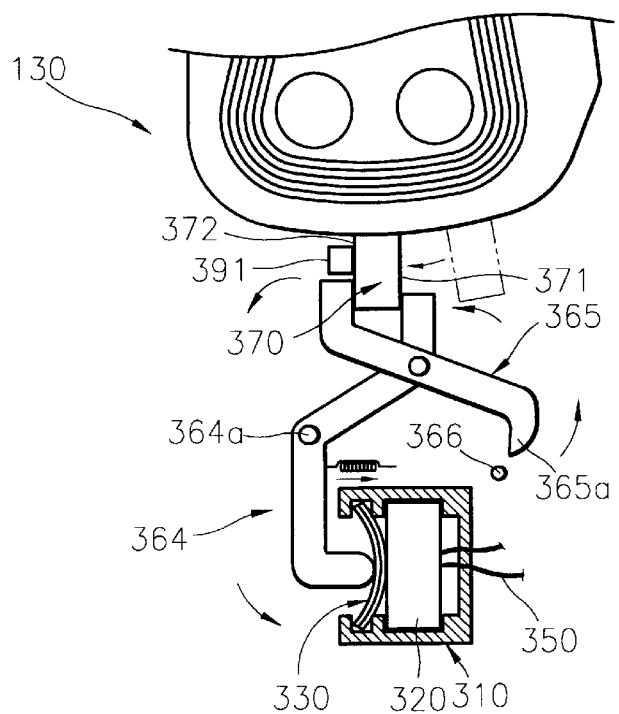

When power is turned off to stop the rotation of the hard disk 120, an electromagnetic force is generated in the magnetic field generated between the coil 135 and the magnet 141, the rotor 130 is thereby rotated such that the magnetic head 150 moves to the parking zone 121. Here, as the other side surface 372 of the protrusion 370 contacts the second lever member 365, the second lever member 365 is pushed counterclockwise on the drawing. Accordingly, the hook portion 365a hooked by the hook pin 366 is released and simultaneously the first lever member 364 is rotated to its original position by an elastic biasing force of the tension spring 340. Thus, as shown in FIG. 11, since the first lever member 364 returns to the position wherein it contacts the one side surface 371 of the protrusion 370, the rotor 130 is locked and cannot rotate any further. Thereafter, as power is turned off, the rotation of the hard disk 120 stops and the lifting of the magnetic head 150 disappears, so that the magnetic head 150 is placed on the parking zone 121.

Figure 12:
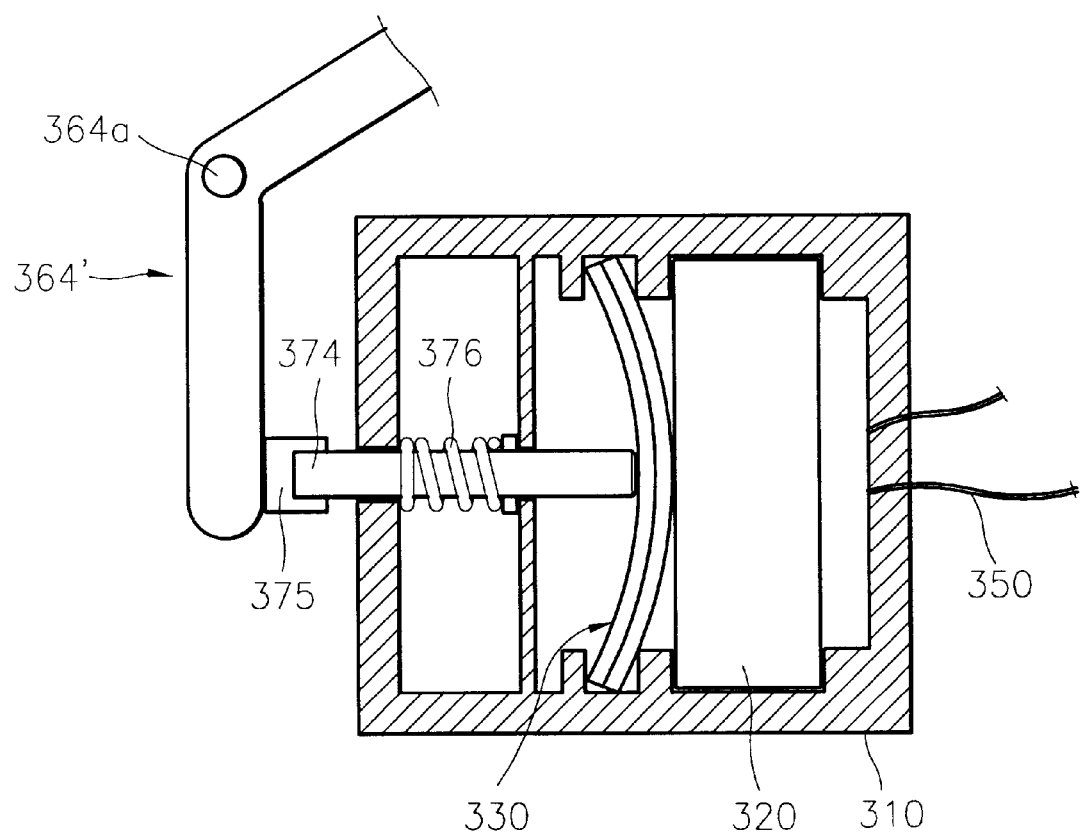
FIG. 12 is a plan view showing another example of the magnetic head transferring device according to the third preferred embodiment of the present invention shown in FIG. 9.

Meanwhile, the third preferred embodiment of the present invention can be modified as shown in FIG. 12. That is, a rod member 374 which is elastically biased by a compression spring 376 is interposed between the bimetal member 330 and the first lever member 364' so that an end portion of the rod member 374 can push the first lever member 364'. Here, a rubber member 375 is preferably installed at the end portion of the rod member 374 to absorb impacts or prevent abrasion. Also, rubber members are preferably installed at the one side surface 371 and the other side surface 372 of the protrusion 370 contacting the fist and second lever members 364 and 365, respectively, to obtain buffering and anti-abrasion effects.

As described above, in the magnetic head transferring device, of a hard disk drive, according to the present invention, since the rotation of the rotor is locked or unlocked using a bimetal member operating according to the turning on/off of power, an abnormal movement of the magnetic head is prevented regardless of the strength of external impacts.

It is contemplated that numerous modifications may be made to the magnetic head transferring device of the present invention without departing from the spirit and scope of the invention as defined in the following claims.

What is claimed is:

1. A magnetic head transferring device, of a hard disk drive, comprising:
    a rotor installed to rotate around a pivot shaft member provided on a base, said rotor having a coupling slot and a magnetic head mounted on one side thereof for reading information from and writing information to said hard disk;
    a stator for rotating said rotor such that said magnetic head moves across a parking zone and a recording zone formed on said hard disk; and
    a bimetal member installed at one end portion of said pivot shaft member and which reversibly deforms to be inserted into or separated from said coupling slot as said bimetal member is heated by an electric current supplied from a predetermined power supply source, wherein said rotor is locked as said bimetal member is coupled to said coupling slot.

2. A magnetic head transferring device, of a hard disk drive, comprising:
    a rotor rotatably installed on a base and having a magnetic head for reading information from and writing information on said hard disk mounted on one side of said rotor;
    a stator for rotating said rotor such that said magnetic head moves across a parking zone and a recording zone formed on said hard disk;
    a first hook portion provided at a second side of said rotor;
    a link member having a first end and a second end, a second hook portion on said first end, for preventing rotation of said rotor by being elastically and selectively coupled to said first hook portion;
    a bimetal member installed adjacent said second end of said link member and, when said bimetal member is heated by a predetermined heating source, said bimetal member is deformed so as to push the second end of said link member to move said link member such that said second hook portion separates from said first hook portion;
    an elastic member for applying a biasing force to said link member so that said second hook portion moves toward said first hook portion so that said first hook portion can be coupled to said second hook portion; and
    a rod member for pushing the second end of said link member as said bimetal member deforms, said rod member being interposed between said bimetal member and the second end of said link member.

3. The magnetic head transferring device of a hard disk drive as claimed in claim 2, further comprising a rubber member for buffering, said rubber member being provided at an end portion of said rod member and in contact with the second end of said link member.

4. A magnetic head transferring device, of a hard disk drive, comprising:
    a rotor rotatably installed on a base and having mounted on one side thereof, a magnetic head for reading information from and writing information on said hard disk;
    a stator for rotating said rotor such that said magnetic head moves across a parking zone and a recording zone formed on said hard disk;
    a protrusion provided at a second side of said rotor, said protrusion having a first side surface and a second side surface;
    a first lever member, rotatably installed on said base, for restricting rotation of said rotor, said first lever member having a first end for contacting said first side surface of said protrusion when said magnetic head is located in the parking zone, said first lever member further including a second end opposite said first lever first end;

a bimetal member installed adjacent to said second end of said first lever member, wherein when said bimetal member is heated by a predetermined heating source, said bimetal member deforms so as to push said second end of said first lever member so that said first end of said first lever member is detached from the first side surface of said protrusion;

a hook pin provided on said base;

a second lever member coupled to said first lever member to be capable of contacting the second side surface of said protrusion, said second lever member having a hook portion to be hooked by said hook pin, wherein said second lever member locks said first lever member as said hook portion is hooked by said hook pin when said first lever member rotates in a direction so as to be detached from said protrusion and is pushed by contact with the second side surface of said protrusion as said rotor rotates such that said magnetic head is located in the parking zone and said hook portion is released from said hook pin; and an elastic member for elastically biasing said first lever member in a direction to contact one side surface of said protrusion.

5. The magnetic head transferring device of a hard disk drive as claimed in claim 4, further comprising a rod member, installed between said bimetal member and said first lever member, for pushing said first lever member upon deformation of said bimetal member.

6. The magnetic head transferring device of a hard disk drive as claimed in claim 5, wherein a rubber member for buffering is provided at one end portion of said rod member for contacting said first lever member.

7. The magnetic head transferring device of a hard disk drive as claimed in claim 6, wherein a rubber member for buffering is respectively provided at said first side surface and said second side surface of said protrusion for contacting said first and second lever members.

8. The magnetic head transferring device of a hard disk drive as claimed in claim 5, wherein a rubber member for buffering is respectively provided at said first side surface and said second side surface of said protrusion for contacting said first and second lever members.

9. The magnetic head transferring device of a hard disk drive as claimed in claim 4, wherein a rubber member for buffering is respectively provided at said first side surface and said second side surface of said protrusion for contacting said first and second lever members.

* * * * *